(No Model.)
A. BEALL.
APPARATUS FOR POACHING EGGS.
No. 267,395. Patented Nov. 14, 1882.
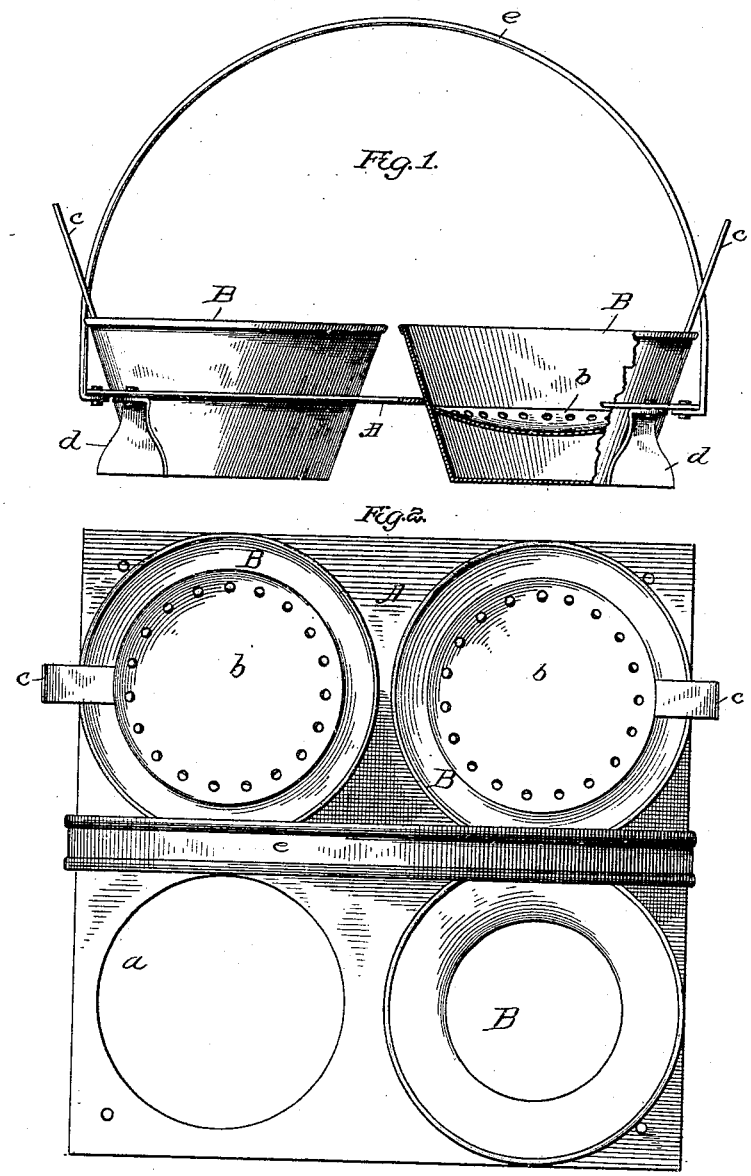
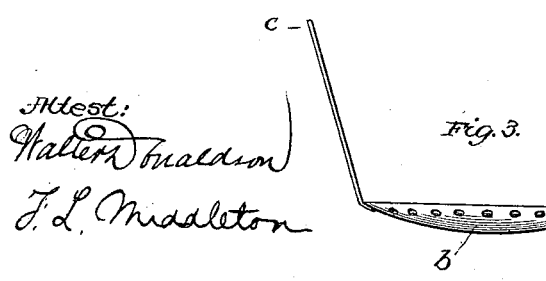

UNITED STATES PATENT OFFICE.

ANNIE BEALL, OF FROSTBURG, MARYLAND.

APPARATUS FOR POACHING EGGS.

SPECIFICATION forming part of Letters Patent No. 267,395, dated November 14, 1882.

Application filed September 26, 1882. (No model.)

*To all whom it may concern:*

Be it known that I, ANNIE BEALL, of Frostburg, in the county of Alleghany and State of Maryland, have invented a new and useful Improvement in Apparatus for Poaching Eggs; and I do hereby declare that the following is a full, clear, and exact description of the same.

My invention is an improved apparatus for poaching eggs.

My object is, first, to simplify the apparatus in its construction and mode of use; second, to provide for poaching the eggs in a cup or cups, instead of immersing the whole apparatus in water; third, to provide means for readily and conveniently removing the eggs when cooked without destroying their coherence or disturbing their shape; fourth, to provide an apparatus which shall permit the removal of one egg without disturbing the others, whereby some eggs may be cooked more and others less.

My invention consists, first, of a cup adapted to hold the heated water, in combination with a removable diaphragm provided with suitable perforations and with a handle, and adapted to rest within the cup above the bottom thereof, whereby the egg may be held upon the diaphragm while cooking and may be removed from the cup when sufficiently cooked.

My invention consists, secondly, of a frame or body adapted to receive a series of the described cups and in combination therewith, the said frame being adapted to be set upon a stove or range and over coals or other heating devices, whereby a series of such cups may be subjected to the heat at the same time.

In the accompanying drawings, Figure 1 shows a side elevation of my improved apparatus, one of the cups being partly broken away to show a section of the diaphragm. Fig. 2 is a plan view of the same. Fig. 3 shows the diaphragm or skimmer detached from the cup.

In these drawings, A represents the base or body of the apparatus, which may be made of tin, iron, or any suitable metal. I have shown it as rectangular in form and adapted to hold four cups; but obviously the size and shape are not material, and may be varied as fancy may dictate or according to the required capacity. In this base are cut openings $a$, shown in the drawings as circular in form, these being the most convenient. Four of these openings are represented in the drawings. They are adapted to receive cups B of convenient size. I have shown in the drawings a preferred shape of cup, which is convenient to be set in the openings in the base of the apparatus; but any other shape may be used without departing from the spirit of my invention. The size also may be varied, although cups two inches in depth and three and a half inches upon the top are convenient for use.

Within the cups I fit a diaphragm, $b$, made in the form of a skimmer, and fitted to rest within the cup by contact of the edges with the side of the cup about two-thirds of the way down between the top and the bottom. This diaphragm or skimmer is provided with a handle, $c$, attached firmly at one edge, and projecting sufficiently far above the edge of the cup to give a convenient hold for the hand in order to remove the diaphragm from the cup. I have shown the handle as projecting straight up from the cup; but it may be made curved or in any convenient shape.

It will be observed by referring to Figs. 1 and 3 that the diaphragm is made concave on its upper surface, like an ordinary skimmer, the concavity being sufficient to hold the egg. Around the edge a row of holes is perforated. These holes are preferably made very small, the purpose of them being to allow the water to pass through, either when the water boils while the diaphragm is in place or to allow the water to run off through the holes when it is lifted out with the egg. The inclination of the sides is such that the diaphragm is supported by contact with the sides, and when it is lifted out it is readily detached without any danger of adhering to the sides of the cup. The holes should be made only at the edge, the central part being closed, so that no part of the albumen of the egg will escape into the water below or adhere to the diaphragm itself.

The plate A is represented as supported upon legs $d$, which project down to the bottom of the cups, so that as the apparatus rests upon the top of the stove or range the bottom of the cups shall be in contact with the surface. A bail, $e$, is attached to the plate midway, so as to conveniently balance the apparatus when it is lifted.

Although I have shown in these figures the described means for supporting and lifting the plate, I do not confine myself to these means, as the plate may be supported in other ways—as, for instance, the cups may be attached securely to the plate and have no other support, but rest directly upon the top of the stove, and obviously other forms of handle may be used.

Instead of the perforations through the edge of the diaphragm or skimmer, notches may be cut in its edge, or small studs may be left in cutting out the metal at equal distances from each other on all sides, so as to bear against the inner surface of the cup and leave a space between the edge of the cup and the said surface for the passage of the water. It is only necessary that there should be at the edge some suitable openings for the passage of the water up or down, in the manner heretofore described.

With the described apparatus the eggs may be cooked equally by exposure of them all to the heat for the same length of time; or, if desired, one or more may be removed from the cups by the removal of the diaphragm, leaving the others exposed to the action of the heat for a longer period.

Obviously in order to remove the egg it is only necessary to lift the diaphragm from the cup, when the water which is above it will escape through the holes or over the edge, leaving the egg entire and free from water and resting upon the concave surface, from which it may be easily transferred without breaking it.

This construction of the apparatus differs from those heretofore devised, particularly in this respect, that in this the water may be placed in the cups and the cups then set upon the stove or range, whereas in the apparatus heretofore shown for the purpose of poaching eggs the whole apparatus is so designed that it is necessary to place it within the water contained in another vessel large enough to receive the whole apparatus. This requires that a much larger amount of water shall be heated, thus requiring, also, more time and a larger expenditure of heat. Further, the removable diaphragm affords easier and better means for removing the egg at any time without rupture.

Any suitable cover may be provided for the cups, it being only necessary that a nick should be left in the side of the cover to admit the handle of the skimmer.

I am aware that a removable cup with a flat bottom and openings in the vertical sides, in combination with a cup for holding the water, is not new.

Having thus described my invention, what I claim is—

1. An egg-poaching apparatus consisting of a cup for holding the water, a concave diaphragm or skimmer provided with a handle and with openings at or near the edge thereof, said diaphragm or skimmer being adapted to rest in the cup, substantially as set forth.

2. The combination of the body or plate A, having openings for the cups, with the cups B, diaphragms or skimmers b, provided with openings and handles, substantially as described.

3. The combination of the plate A, supporting-legs d, handle e, and cups B, with the diaphragms or skimmers b, all substantially as described.

In testimony whereof I have signed my name to this specification in the presence of two subscribing witnesses.

ANNIE BEALL.

Witnesses:
  F. L. MIDDLETON,
  WALTER DONALDSON.